United States Patent [19]

Boomgaard et al.

[11] Patent Number: 4,629,983
[45] Date of Patent: Dec. 16, 1986

[54] DIGITAL ROD POSITION DETECTOR SYSTEM

[75] Inventors: Dirk J. Boomgaard, Monroeville; James A. Neuner, Richland Township, Allegheny County, both of Pa.

[73] Assignee: Westinghouse Electric Corp., Pittsburgh, Pa.

[21] Appl. No.: 657,423

[22] Filed: Oct. 3, 1984

[51] Int. Cl.$^4$ .............................................. G01B 7/14
[52] U.S. Cl. ................................... 324/208; 376/258; 340/870.31
[58] Field of Search ................. 324/207, 208; 376/258; 336/45; 340/870.31, 870.32

[56] References Cited

U.S. PATENT DOCUMENTS

| | | | |
|---|---|---|---|
| 3,846,771 | 11/1974 | Young et al. | 340/870.02 |
| 3,852,661 | 12/1974 | Szabo et al. | 376/258 X |
| 3,858,191 | 12/1974 | Neuner et al. | 340/870.31 |
| 3,893,090 | 7/1975 | Neuner et al. | 340/870.02 |

Primary Examiner—Reinhard J. Eisenzopf
Assistant Examiner—Robert W. Mueller
Attorney, Agent, or Firm—Daniel C. Abeles

[57] ABSTRACT

Coils placed at spaced locations along the path of an axially movable magnetically permeable and/or electrically conductive rod, which changes the impedance of each coil as it passes through, are connected in sets with each set comprising two series connected groups of equal numbers of parallel connected, non-adjacent coils energized by an a-c source. The voltage at the common node of each set of coils, which fluctuates as equal and unequal numbers of coils in the two groups in a given set are penetrated by the end of the rod, is compared with the voltage at the common node of a pair of series connected resistors, also energized by the a-c source, to generate one digit of an unambiguous, multi-digit, digital rod position signal. Since only one signal wire to the remote electronics is required for each set of coils, and since they only carry a voltage signal, the required wiring is minimized. Compensation is provided to maintain the location of the rod end relative to each coil at which the digital signal changes state despite variations in temperature and voltage.

15 Claims, 3 Drawing Figures

DIGITAL ROD POSITION DETECTOR SYSTEM

FIELD OF THE INVENTION

This invention relates to apparatus for generating a digital signal representative of the location of the end of an axially movable, magnetically permeable elongated member such as the control and other rods which are insertable into the core of a nuclear reactor. It utilizes a succession of spaced electrical coils through which the end of the elongated member passes sequentially and a unique arrangement for connecting the coils to generate an unambiguous digital position signal with a minimum of hardware and wiring.

PRIOR ART

There are many applications where it is desirable to remotely determine the position of an axially movable, magnetically permeable, elongated member. One such application is monitoring the position of the various types of rods which are insertable into the core of a nuclear reactor. These include control rods which regulate the power level and distribution of power in the reactor core as well as gray rods and any other type of rod used to control the reactivity of the core.

For pressurized water reactors it is of utmost importance to know the accurate position of each of the control rods. Differences in penetration of over 15 inches in neighboring rods are considered undesirable. In addition, accurate knowledge of the position of the control rods versus thermal power output can be used to determine the state of fuel burn-up in the core.

The control rods in a pressurized water reactor move within a pressure vessel and are attached to drive rods which can be incrementally moved in an upward or downward direction by a drive mechanism such as the magnetic jack mechanism described in U.S. Pat. No. 3,158,766. The drive rods extend longitudinally through the reactor head along the axis of movement of the control rods into the sealed, pressurized environment of the rod travel housings. Since it is of the utmost importance to maintain the sealed integrity of the pressurized vessel, mechanical penetrations are kept to a minimum to reduce the likelihood of loss of the pressurized environment. Accordingly, no mechanical penetrations are permitted for detecting the relative position of the control rods within the core of the reactor. Inasmuch as it would be very difficult to detect the position of the actual control rods, it has been the practice to detect the position of the drive rods and to derive control rod position therefrom.

There have been a number of schemes devised for detecting drive rod position. Early systems used the change in the impedance of a coil or the change in coupling between primary and secondary coils effected by the end of the drive rod as it moved through the coil to generate an analog signal indicative of rod position. The susceptability of such analog systems to variations in temperature, rod magnetization, permeability of the rod, and power supply voltage and frequency, and to interference from adjacent control rods and drive mechanisms, led to the development of digital position indicating systems such as that disclosed in U.S. Pat. No. 3,846,771. This system uses a number of discrete coils spaced along the linear path traced by the end of the rod. The change in the impedance of each coil in sequence as the rod advances through successive coils is used to generate discrete output signals or one output signal with discrete levels. In one embodiment, adjacent coils are each connected to differential amplifiers so that the largest differential signal, which is generated by the amplifier connected to one coil which has been penetrated by the end of the rod and one which has not, indicates rod position.

U.S. Pat. No. 3,858,191 utilizes two sets of these discrete coil detectors interleaved to provide redundancy. In this system, the differential a-c signals in each set of coils are each rectified and passed through a low pass filter to extract the d-c component. These d-c difference signals are then applied to the non-inverting inputs of comparators in a tracking level detector/encoder circuit in which the outputs of the comparators are fed back to the inverting inputs on a common bus so that only the comparator to which the difference signal of largest magnitude is applied is switched to the active state. The comparator outputs also generate a coded digital signal representative of the largest difference signal in the set which is processed with the coded signal from the other set to generate a display illustrating the position of the control rod. U.S. Pat. No. 3,893,090 discloses a similar interleaved, redundant system in which the processing means adjusts the display of rod position to the coarser resolution which prevails when one of the redundant sets is out of service.

Commonly owned U.S. patent application Ser. No. 573,459 entitled "Digital, Electromagnetic Rod Position Indicator With Compensation" filed on Jan. 24, 1984 in the names of M. M. Feilchenfeld and C. G. Geis, discloses a system which improves the accuracy of these discrete coil, digital position detectors by storing, in digital form, compensation signals which automatically adjust the location relative to the coils at which the digital output signal transitions from one code to the next. Circuitry needed to apply the correct compensation for the direction of travel of the rod, for direction reversal and for initial start-up or after a power failure, add considerable complexity to the system which is only economically justified where very high accuracy is required.

While it is always desirable to reduce the size and cost of a position detector for both the new sale and retrofit markets, it is especially compelling in the case of rod position detectors for some of the newer reactors which has a great many more rods to be monitored. While detectors which generate voltage rather than current signals permit the use of small wires, it is also desirable to design a detector which requires fewer wires leading from the sensors.

SUMMARY OF THE INVENTION

According to the invention, the location of the end of a magnetically permeable and/or electrically conductive, elongated member is detected by sensing the change in impedance of a succession of discrete electrical coils spaced along the path followed by the end of the elongated member. The coils are connected in sets with each set including two groups each having equal numbers of coils connected in parallel and with the two groups connected in series at a common node. None of the coils in a given set are adjacent to any of the other coils in the set. That is, the end of the elongated member passes through a coil in another set between coils in a given set.

An alternating current source is connected across each set of coils and across a pair of impedances, preferably resistors, also connected in series at a common node. With the ratio of the impedances of the coils in a first group in each set of coils to that of the second group equal to the ratio of the impedance of the first resistor to the second, and preferably the impedances of all the coils are the same and the resistors are equal in electrical value, there will be no voltage differential between the common node of the resistors and the common node of a set of coils in which the end of the elongated member has penetrated the same number of coils in each group of the set, i.e. none of the coils in the set, all of the coils, or for instance, one coil in each group. However, at those positions where the end of the elongated member penetrates unequal numbers of coils in the two groups of coils in a given set, an a-c difference voltage will appear between the common node of that set and the common node of the resistors. The coils are assigned to the various sets and groups such that as the end of the elongated member passes through successive coils, the overall pattern of differential voltages appearing between the common nodes of the sets of coils and the common node of the resistors varies uniquely to indicate the location of the end of the elongated member.

In order to provide an unambiguous code representative of the location of the end of the elongated member, the total number of sets of coils must be at least equal to the number of coils in a set. While any even number of coils can be equally divided into the two groups comprising a set, it is advantageous to assign 2, 4, 8, et cetera, coils to a set to minimize the number of digits required to produce an unambiguous digital output signal. At the other end of the scale, the number of coils in a group can be reduced to one such that a set comprises two coils connected in series. While this later arrangement requires more wires, it provides better discrimination between signal states.

Output signal generating means connected to the common node of the resistors and the common node of each set of coils produces from the pattern of differential a-c voltages, a signal, preferably binary, representative of the location of the end of the elongated member. In the exemplary embodiment of the invention, the differential a-c voltages are converted to average d-c signals which are compared with a threshold voltage to generate the binary output signal. The threshold voltage may be varied manually or automatically in response to ambient conditions to which the detector coils are exposed. In the preferred embodiment, two additional coils located beyond the normal range of travel of the end of the elongated member, one which is always penetrated by the rod and one which is never influenced by it, are connected in series across the alternating current source. The differential voltage generated between the common node of these additional coils and the common node of the resistors may be used to generate the variable threshold voltage to provide compensation for ambient conditions such as temperature and variations in voltage of the alternating current source. The threshold voltage can be scaled such that the binary output signal transitions from one value to the next when the end of the elongated member passes a selected point such as the midpoint of the coils.

As adapted to monitoring the penetration into the core of the various types of rods which affect the reactivity of a nuclear reactor, the present invention is particularly advantageous in that it greatly reduces the amount of wiring required. Since the electronics are located remotely from the detector coils, it is the wiring from the common nodes of the coil sets to the remote location that is of most concern. Even in the embodiment of the invention where each coil set only includes two series connected coils, the remote signal wiring is reduced by one-half over the prior art systems. The reduction in signal wiring increases arithmetically with the number of coils in a set. For instance, with four coils in a set, the wiring is reduced by three fourths and for the eight coil set, it is reduced by seven eighths. When this reduction in the number of wires is combined with the reduction in the size of the wire required to transmit a voltage signal as opposed to the current signals required in some prior art systems, the total savings in material, space, and cost is very substantial and is especially significant for the newer plants that may have in the neighborhood of 180 rods to be instrumentated.

BRIEF DESCRIPTION OF THE DRAWINGS

A full understanding of the invention can be gained from the following description taken in conjunction with the accompanying drawings in which like reference characters are used to designate like elements in all the figures and in which.

DESCRIPTION OF THE PREFERRED EMBODIMENT

Figure 1:
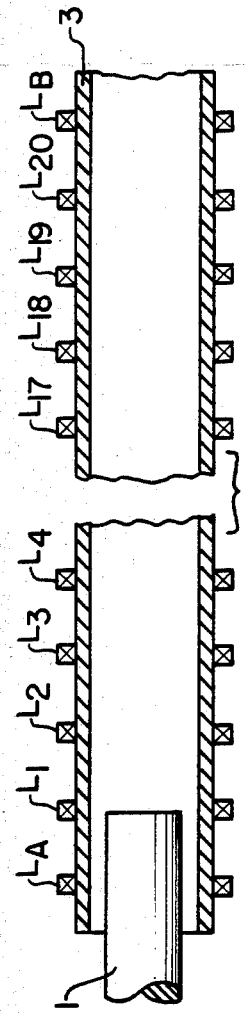
FIG. 1 is a longitudinal section through a portion of a drive rod assembly for a nuclear reactor showing the arrangement of the coils of a digital position detector which is adaptable for use in accordance with the teachings of this invention.

While the invention will be described as applied to a position indicating system for the control rods of a nuclear reactor, it is to be understood that the invention has broader application to other installations where it is desirable to monitor the location of the end of a longitudinally movable, magnetically permeable and/or electrically conductive, elongated member. As seen in FIG. 1, the drive rod 1 connected to a control rod (not shown) in a nuclear reactor, is longitudinally movable within a tubular housing 3. The drive rod is preferably made of a material of high magnetic permeability such as steel. It could also be made of an electrically conductive material in which eddy currents can be induced by magnetic fields. A plurality of electrical coils, $L_1$ through $L_{20}$, (only some shown to permit a larger scale to be used) surround the housing 3 at spaced intervals. The number of coils and their spacing are dependent on the range of travel of the rod 1 and the resolution of rod position desired, thus the number of coils shown is illustrative only. Two additional coils $L_A$ and $L_B$ may be provided at opposite ends of the coil array to provide compensation as discussed more fully below. These additional coils are beyond the limits of travel of the drive rod 1 which always extends through the coil $L_A$ but never reaches the coil $L_B$.

Figure 2:
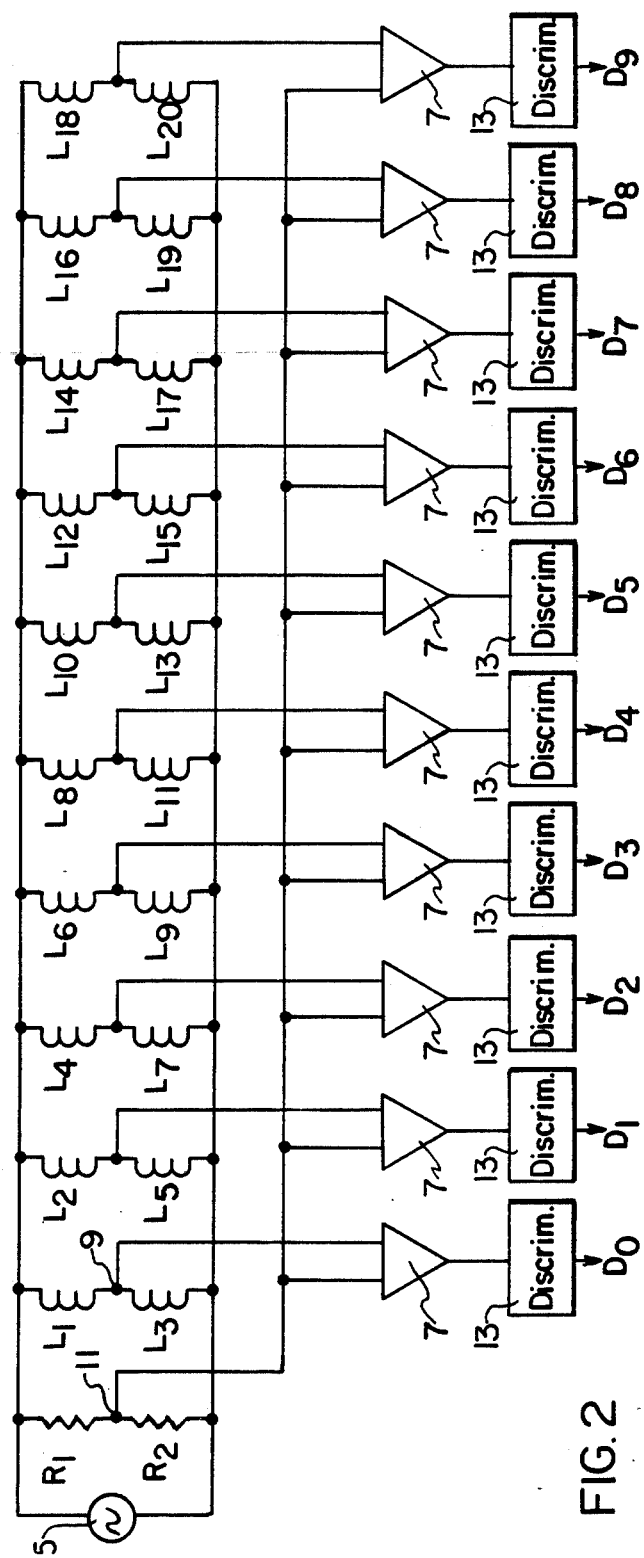
FIG. 2 is a schematic diagram illustrating a circuit according to one embodiment of the invention that can be attached to the coils shown in FIG. 1 to monitor the location of the end of the drive rod.

As shown in FIG. 2, each of the coils $L_1$ through $L_{20}$ is energized by a low voltage, low frequency, for instance 12 volts 60 hertz, a-c power source 5. The magnetic fields generated by such a low frequency current in the coils penetrate the non-magnetic housing 3 and, where it is present, the drive rod 1. Since the drive rod is electrically conductive and/or preferably magnetically permeable, the impedance of each coil in succession changes as the end of the drive rod passes through it. Thus by monitoring the sequential changes in the impedances of the coils, the movement of the rod can be tracked.

In the embodiment of the invention shown in FIG. 2, pairs of the detector coils are connected in series across the alternating current source 5 together with a pair of series connected resistors $R_1$ and $R_2$. Associated with each pair of series connected coils, is an operational amplifier 7 which has one input connected to the common node 9 of the associated coil pair and a second input connected to the common node 11 between the series connected resistors $R_1$ and $R_2$. The operational amplifiers 7 amplify any difference between the a-c voltages appearing at the common node 11 of the resistor pair and at the common node 9 of the associated coil pair to generate a-c difference signals which are applied to discriminators 13 which each generate a digital output signal $D_0$ through $D_9$.

With the ratio of the resistances of the resistors $R_1$ and $R_2$ equal to the ratio of the impedances of the upper coil in each pair shown in FIG. 2 to that of the lower coil, and preferably with matched resistors and matched coils, the voltage at the common node 11 of the resistor pair and the voltage at the common node 9 of a given coil pair will be the same as long as the end of the drive rod has not penetrated either coil in the pair or has penetrated both coils. As the drive rod 1 begins to penetrate one coil in a pair, for instance $L_1$, the impedance of that coil changes to generate a differential a-c voltage which is amplified by the associated operational amplifier 7. When the amplified a-c difference voltage reaches a threshold value, the digital signal $D_0$ generated by the associated discriminator 13 changes value. As will be discussed more fully below, the threshold at which the digital output changes can be set so that the output signal transitions from a low to a high state as the end of the rod 1 passes through the midpoint of the coil. As the rod 1 continues its travel and passes through the coil $L_2$, the output signal $D_1$ switches from a low to a high state. When the rod passes through coil $L_3$, the signal $D_0$ switches back to the low state, since with both coils in the associated pair, $L_1$ and $L_3$, penetrated by the rod, the difference in the voltage between the common resistor node 11 and the associated common coil node 9 no longer exceeds the threshold voltage. Under these conditions, the signal $D_1$ will stay in the high state until the end of rod 1 has passed through coil $L_5$, but by this time, the signal $D_2$ will be high since the end of the rod passes through coil $L_4$ before $L_5$. Table 1 illustrates the pattern of the binary output signals $D_0$ through $D_9$ generated as the end of the rod 1 progresses through the series of coils $L_1$ through $L_{20}$.

TABLE 1

| POS | $D_9$ | $D_8$ | $D_7$ | $D_6$ | $D_5$ | $D_4$ | $D_3$ | $D_2$ | $D_1$ | $D_0$ |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 1 |
| 2 | 0 | 0 | 0 | 0 | 0 | 0 | 0 | 0 | 1 | 1 |
| 3 | 0 | 0 | 0 | 0 | 0 | 0 | 0 | 0 | 1 | 0 |
| 4 | 0 | 0 | 0 | 0 | 0 | 0 | 0 | 1 | 1 | 0 |
| 5 | 0 | 0 | 0 | 0 | 0 | 0 | 0 | 1 | 0 | 0 |
| 6 | 0 | 0 | 0 | 0 | 0 | 0 | 1 | 1 | 0 | 0 |
| 7 | 0 | 0 | 0 | 0 | 0 | 0 | 1 | 0 | 0 | 0 |
| 8 | 0 | 0 | 0 | 0 | 0 | 1 | 1 | 0 | 0 | 0 |
| 9 | 0 | 0 | 0 | 0 | 0 | 1 | 0 | 0 | 0 | 0 |
| 10 | 0 | 0 | 0 | 0 | 1 | 1 | 0 | 0 | 0 | 0 |
| 11 | 0 | 0 | 0 | 0 | 1 | 0 | 0 | 0 | 0 | 0 |
| 12 | 0 | 0 | 0 | 1 | 1 | 0 | 0 | 0 | 0 | 0 |
| 13 | 0 | 0 | 0 | 1 | 0 | 0 | 0 | 0 | 0 | 0 |
| 14 | 0 | 0 | 1 | 1 | 0 | 0 | 0 | 0 | 0 | 0 |
| 15 | 0 | 0 | 1 | 0 | 0 | 0 | 0 | 0 | 0 | 0 |
| 16 | 0 | 1 | 1 | 0 | 0 | 0 | 0 | 0 | 0 | 0 |
| 17 | 0 | 1 | 0 | 0 | 0 | 0 | 0 | 0 | 0 | 0 |
| 18 | 1 | 1 | 0 | 0 | 0 | 0 | 0 | 0 | 0 | 0 |
| 19 | 1 | 0 | 0 | 0 | 0 | 0 | 0 | 0 | 0 | 0 |
| 20 | 0 | 0 | 0 | 0 | 0 | 0 | 0 | 0 | 0 | 0 |

It will be noticed from FIG. 2 that the coils in each series connected pair are not adjacent to one another. This is to provide a unique pattern for the output signals $D_0$ through $D_9$ for all positions of the end of rod 1 relative to the coils. If, for instance, coils $L_1$ and $L_2$ were paired, all signals $D_0$ through $D_9$ would be in the low state when none of the coils were penetrated, $D_0$ would go high when coil $L_1$ was penetrated and would go low again when the rod passed through $L_2$. Thus, again all the output signals would be in the low state. If all the coils were connected sequentially in pairs, this ambiguity of an all low state output signal would be generated each time the rod passed through the second coil of a pair. By providing that another coil in another pair of coils will be penetrated before the second coil in any given pair is penetrated, a unique pattern of output signals, such as shown in Table 1, is generated. To assure that no ambiguities are generated in either direction of travel of the rod 1, the intermediate coil pairs are selected such that a coil in a pair on either side of a given pair of coils is penetrated by the rod end between the coils in that given pair.

It will be noted that with the embodiment of the invention disclosed in FIG. 2, only one signal wire for each pair of coils plus two wires for the a-c power source are required from the detector to the remotely located electronics which begins with the operational amplifiers 7. Furthermore, since the signal wires only carry a voltage signal, they can be very small gage. This results in a significant savings in space and material over prior art systems. Since the resistors $R_1$ and $R_2$ are physically part of the remotely located electronics, the lead from their common node 11 to the operational amplifiers 7 is not as much of a concern but again, it only carries a voltage signal and therefore can be of very small gage.

Figure 3:
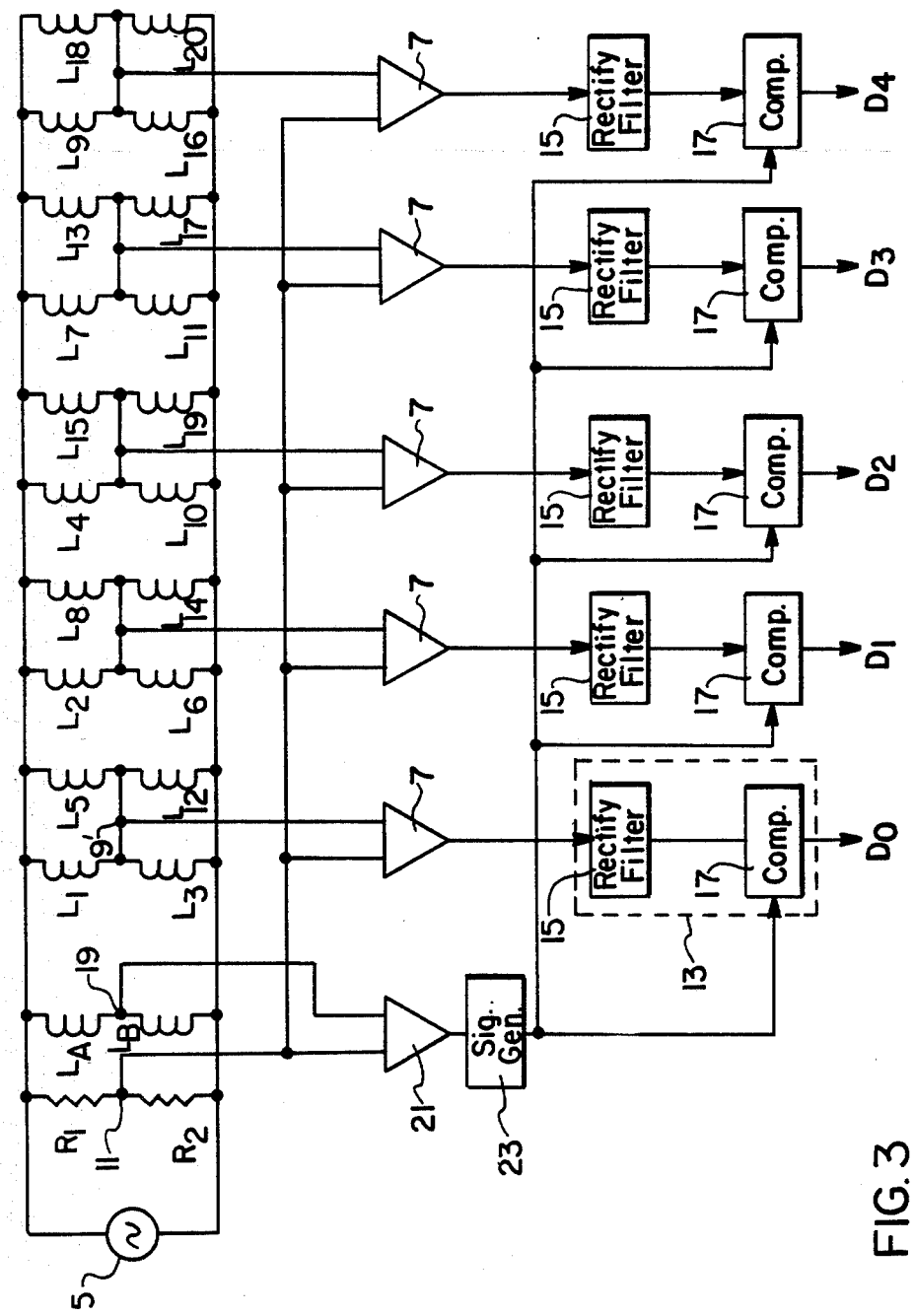
FIG. 3 is a schematic diagram of another embodiment of the invention illustrating another arrangement for connecting the coils shown in FIG. 1.

A second embodiment of the invention is illustrated in FIG. 3. In this arrangement, the coils $L_1$ through $L_{20}$ are arranged in sets with each set including an upper group and a lower group, each comprising two coils connected in parallel and with the two groups of coils connected in series at a common node 9'. As in the case of the circuit of FIG. 2, the voltage at the common node 9' of each set of coils is compared with the voltage at the common node 11 of the resistor pair $R_1$ and $R_2$ in an operational amplifier 7. Again, the amplified a-c difference signal is applied to a digital signal generator 13 which includes a rectifier/filter circuit 15 which generates a mean d-c difference signal and a comparator 17 which compares the mean d-c difference signal to a threshold signal and generates a digital output signal having a high state when the difference voltage equals or exceeds the threshold and a low state otherwise.

The threshold voltage can be a fixed or manually adjustable reference voltage or it can be an automatically generated signal as shown. One way of generating an automatic threshold voltage is to connect the two additional coils $L_A$ and $L_B$ in series and compare the voltage at their common node 19 with the resistor pair common node voltage in an operational amplifier 21 and generate a d-c threshold voltage in a signal generator 23 as a function of the differential a-c voltage. In this arrangement, the signal generator 23 generates a threshold voltage selected to cause the output states of the comparators 17 to switch when the end of the rod 1 passes through the midpoint of the associated coil $L_1$ through $L_{20}$. The use of the coil pair $L_A$ and $L_B$, located within the same environment as coils $L_1$ through $L_{20}$, to produce a threshold voltage provides automatic compensation for the affects of variations in temperature and supply voltage on the point relative to each coil at which the associated digit of the digital position signal changes state.

The pattern of digital output signals, $D_0$ through $D_4$, generated by the arrangement of FIG. 3 is shown in Table 2.

TABLE 2

| POS | $D_4$ | $D_3$ | $D_2$ | $D_1$ | $D_0$ |
|---|---|---|---|---|---|
| 0 | 0 | 0 | 0 | 0 | 0 |
| 1 | 0 | 0 | 0 | 0 | 1 |
| 2 | 0 | 0 | 0 | 1 | 1 |
| 3 | 0 | 0 | 0 | 1 | 0 |
| 4 | 0 | 0 | 1 | 1 | 0 |
| 5 | 0 | 0 | 1 | 1 | 1 |
| 6 | 0 | 0 | 1 | 0 | 1 |
| 7 | 0 | 1 | 1 | 0 | 1 |
| 8 | 0 | 1 | 1 | 1 | 1 |
| 9 | 1 | 1 | 1 | 1 | 1 |
| 10 | 1 | 1 | 0 | 1 | 1 |
| 11 | 1 | 0 | 0 | 1 | 1 |
| 12 | 1 | 0 | 0 | 1 | 0 |
| 13 | 1 | 1 | 0 | 1 | 0 |
| 14 | 1 | 1 | 0 | 0 | 0 |
| 15 | 1 | 1 | 1 | 0 | 0 |
| 16 | 0 | 1 | 1 | 0 | 0 |
| 17 | 0 | 0 | 1 | 0 | 0 |
| 18 | 1 | 0 | 1 | 0 | 0 |
| 19 | 1 | 0 | 0 | 0 | 0 |
| 20 | 0 | 0 | 0 | 0 | 0 |

It will be noted that the end of rod 1 passes through a coil in another set between coils in any given set so that no ambiguous output signals are generated. It will also be noted that only one wire for every four coils plus two wires for a-c power need be run from the detector to the remote electronics. The combining of coils in sets thus greatly increases the efficiency of the detector system. It is advantageous to combine 2, 4, 8, et cetera, coils in a set to obtain unambiguous digital output signals with the fewest number of binary digits. There are limitations, however, on adding coils to a set. In order to generate a unique output signal for all positions of the end of rod 1, the number of sets of coils must not be less than the number of coils in a set. In addition, as coils are added to a set, the relative change in impedance caused by transit of the end of the rod through a coil in the set becomes less and less. Thus, the differential a-c signal becomes smaller and therefore more difficult to detect reliably.

In sum, the present invention provides accurate monitoring of the location of an axially movable rod with a minimum of hardware and wiring. In addition, a digital position signal is generated without counting, so that an interruption of power has no affect on the reading. It will also be noted from an examination of Tables 1 and 2, that the digital signals generated by the invention follow a Gray code in which only one digit of the output signal changes state at a time. This eliminates erroneous signals which can occur in a true binary coded signal where two or more digits change state on a given transition but the changes do not occur simultaneously.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for detecting the location of an end of an elongated, longitudinally movable member, comprising:
    a plurality of spaced, discrete electrical coils through which said elongated member passes sequentially in moving longitudinally and in so doing, varies the inductance of each coil as it passes therethrough;
    means connecting said plurality of coils in sets with each set including first and second groups of equal numbers of said coils connected in parallel, with the two groups of coils connected in series at a common node, with none of the coils in any given set being adjacent to any other coil in the set, and with the number of sets equal at least to the number of coils in a set;
    a pair of impedances connected in series at a common node;
    an alternating current source connected across said sets of coils and said pair of impedances; and
    output signal generating means connected between the common node of said pair of impedances and the common nodes of each of said sets of coils with the ratio of the impedances of the pair of impedances being the same as the ratio of the impedance of each coil in the first group to the impedance of each coil in the second group of each set, said output signal generating means being responsive to the successive change in impedance in each coil resulting from penetration of the coil by the end of said elongated member to generate output signals representative of the position of the end of said elongated member relative to said coils.

2. The apparatus of claim 1 wherein each of the coils is substantially similar and wherein said pair of impedances are substantially similar.

3. The apparatus of claim 2 wherein said output signal generating means generates a binary Gray code output signal.

4. The apparatus of claim 3 wherein the output signal generating means comprises a plurality of operational amplifiers each having one input connected to the common node of said pair of impedances and a second input connected to the common node of one set of coils.

5. The apparatus of claim 3 wherein said coils are arranged in said sets such that the end of said elongated member passes alternately through coils in the two groups of a set and passes through a coil in another set between passing through two coils in any given set.

6. The apparatus of claim 5 wherein said output signal generating means includes:

means for generating d-c signals representative of the mean difference between a signal generated at the common node of each set of coils and a reference signal generated at the common node of said pair of impedances;

means for generating a threshold signal representative of a change in impedance of a coil due to a selected degree of penetration of a coil by the end of said elongated member; and means for comparing each d-c signal with the threshold signal and for generating for each d-c signal a digital output signal of one value when the d-c signal exceeds the threshold value and another value when it does not.

7. The apparatus of claim 6 wherein said means for generating said threshold signal includes means for generating a threshold signal which varies in value as a function of selected ambient conditions.

8. The apparatus of claim 7 wherein said threshold signal generating means includes first and second additional coils connected in series at a common node and mounted out of the range of travel of the end of said elongated member such that said elongated member always penetrates said first additional coil and never penetrates the second, and means connected to the common node of said additional coils and to the common node of said pair of impedances to generate said threshold signal as a function of the difference between signals generated at theses two common nodes.

9. The apparatus of claim 6 wherein the selected degree of penetration of a coil by the end of the elongated member is about half way.

10. The apparatus of claim 5 wherein each group of coils comprises two coils.

11. The apparatus of claim 5 wherein each group of coils comprises one coil.

12. Apparatus for detecting the location of a free end of a rod axially insertable into a core of a nuclear reactor, comprising:
- a plurality of electrical coils of substantially equal electrical value spaced along the axially extending path followed by said free end of the rod;
- means connecting pairs of non-adjacent coils in series at a common node;
- a pair of substantially matched resistors connected in series at a common node;
- an alternating current source connected across said pairs of coils and across said pair of resistors; and
- output signal generating means connected to the common node between said pair of resistors and to each of the common nodes between the pairs of coils and responsive to electrical parameters at said nodes as affected by the successive pentration of said coils by said free end of the rod to generate discrete digital output signals representative of the location relative to the coils of the free end of the rod.

13. The apparatus of claim 12 wherein the coils are connected in said pairs such that in traveling in either direction, the end of the rod passes through a first coil in a given pair of coils other than an end pair, and then a coil in the next preceding pair of coils, followed by a coil in the next succeeding pair before passing through the second coil in the given pair.

14. The apparatus of claim 12 wherein said output signal generating means includes:
- a plurality of operational amplifiers each having one input connected to the common node of said pair of resistors, and another input connected to the common node of one of said pairs of coils to generate an a-c difference signal;
- means for rectifying and filtering each of said a-c difference signals to generate mean d-c difference signals for each pair of coils;
- means for generating a threshold signal; and
- a plurality of comparators each having said threshold signal applied to a first input and a d-c difference signal applied to a second input to generate a digital output signal at one level when the mean d-c signal exceeds the threshold signal and at a second level when it does not, said threshold having a level selected such that said digital signal switches from one level to the next when the end of said rod passes a selected position relative to one of the coils in the pair.

15. The apparatus of claim 12 wherein said pairs of coils are arranged in sets comprising at least two of said pairs of coils each and with the pairs of coils in each set connected at their common nodes to form a shared common node and wherein said output signal generating means includes means connected to the common node of said resistors and each shared common node.

* * * * *